Nov. 28, 1939.  R. P. BOLLING  2,181,362
STOVE STRUCTURE
Filed June 22, 1938  3 Sheets-Sheet 1

INVENTOR.
Robert P. Bolling
BY
ATTORNEY.s

Nov. 28, 1939.    R. P. BOLLING    2,181,362
STOVE STRUCTURE
Filed June 22, 1938    3 Sheets-Sheet 2

INVENTOR.
Robert P. Bolling
BY
ATTORNEY.S

Nov. 28, 1939.   R. P. BOLLING   2,181,362
STOVE STRUCTURE
Filed June 22, 1938   3 Sheets-Sheet 3

INVENTOR.
Robert P. Bolling
BY Barnes, Kisselle, Laughlin & Raisch
ATTORNEYS

Patented Nov. 28, 1939

2,181,362

UNITED STATES PATENT OFFICE 2,181,362

STOVE STRUCTURE

Robert P. Bolling, Detroit, Mich.

Application June 22, 1938, Serial No. 215,171

7 Claims. (Cl. 126—33)

This invention relates to a structure in the nature of a stove which provides one or more oven compartments for preparing edible bake goods and which also is arranged to provide a surface in the nature of a hot plate for the preparation of edible fried goods.

In many hotels, eating houses and restaurants, it is desirable that foods both of the baked variety and the fried variety be available for serving, and this invention aims to provide a single structural unit for the baking of some goods and frying of others. Also, in some cases it is desirable to cook food stuffs in an open vessel where the food stuff is boiled, and the invention also aims to provide an arrangement so that goods of this nature may be prepared. A device constructed in accordance with the invention may be varied so that the different units have different capacities; that is to say, the capacity of the baking compartment or compartments may be varied, and also the capacity of the frying surface or hot plate and arrangement for boiling food stuffs may be varied.

Structures for carrying out the invention are shown in the accompanying drawings, and in these drawings.

Figure 5:
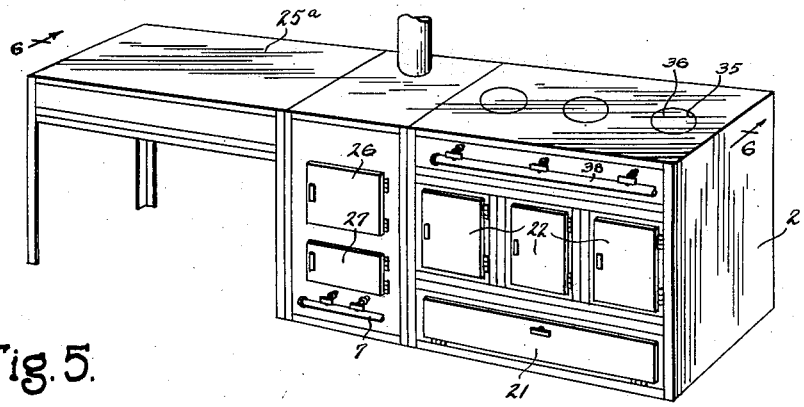

Fig. 5 is a perspective view of a modified form of device.

Figure 6:
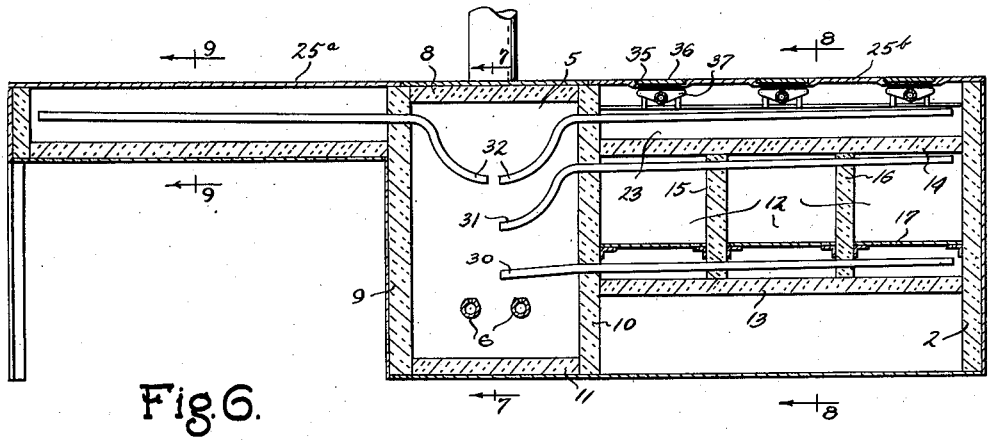

Fig. 6 is a sectional view taken substantially on line 6—6 of Fig. 5.

Figure 7:
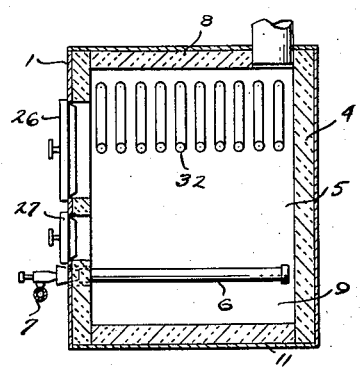

Fig. 7 is a sectional view taken substantially on line 7—7 of Fig. 6 showing the combustion compartment.

Figure 8:
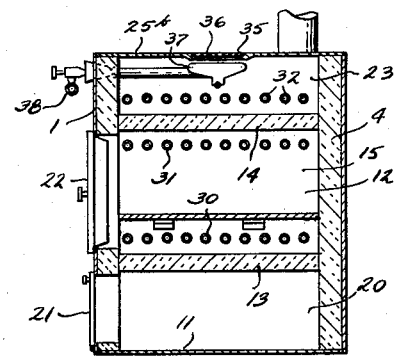

Fig. 8 is a sectional view taken substantially on line 8—8 of Fig. 6 showing the baking compartment, hot plate arrangement, and arrangement for heating an open vessel.

Figure 9:
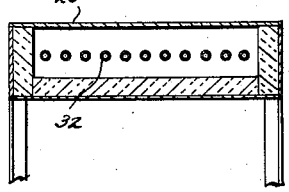

Fig. 9 is a cross sectional view taken substantially on line 9—9 of Fig. 6, showing the hot plate arrangement.

Figure 10:
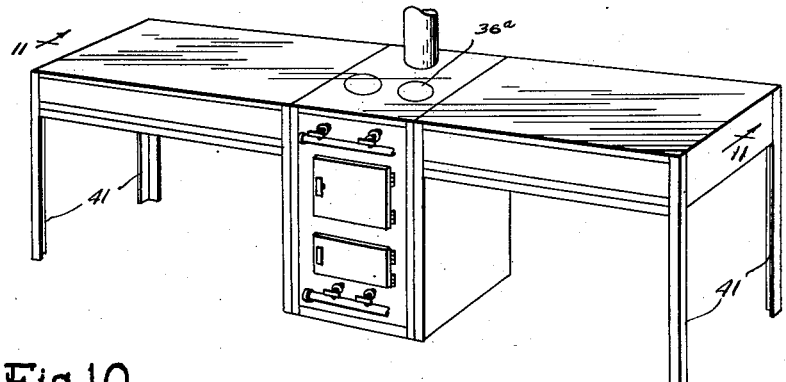

Fig. 10 is a perspective view of a modified arrangement wherein no baking compartments are employed.

Figure 11:
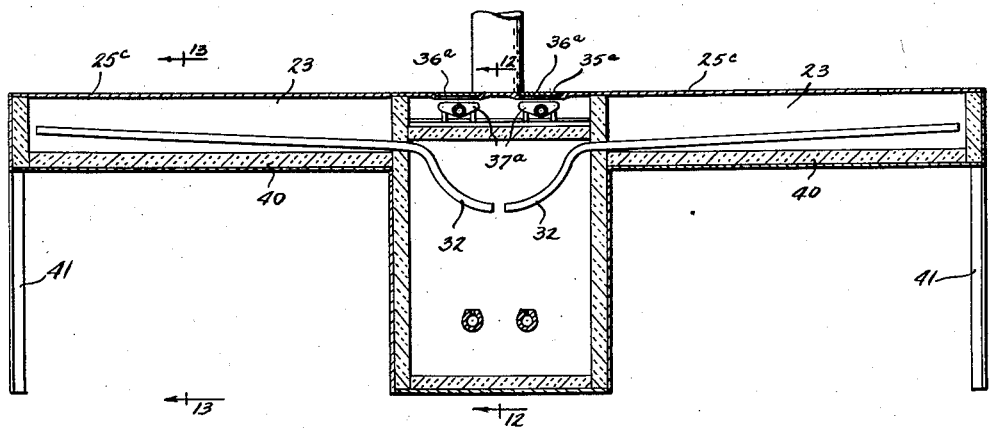

Fig. 11 is a longitudinal sectional view taken substantially on line 11—11 of Fig. 10.

Figure 12:
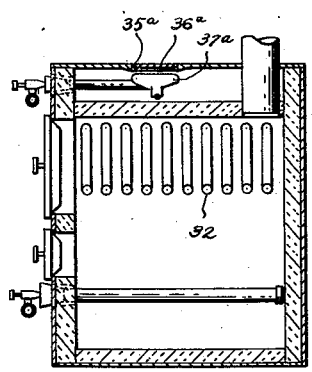

Fig. 12 is a cross sectional view taken substantially on line 12—12 of Fig. 11 showing the combustion compartment and associated compartments.

Figure 13:
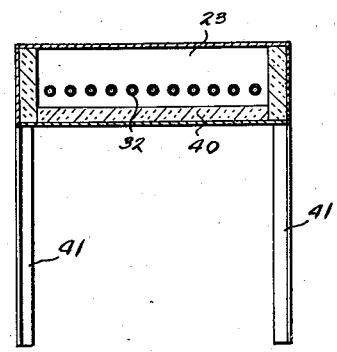

Fig. 13 is a sectional view taken substantially on line 13—13 of Fig. 11.

In the following description some of the forms are termed an "oven" even though the structure thus termed includes a hot plate or frying surface, and in some instances includes an arrangement for the heating of an open cooking vessel. As illustrated in Figs. 1 to 4, inclusive, the oven is in the form of an elongated structure with a front wall generally illustrated at 1 and end walls 2 and 3 and a rear wall 4. These walls may follow the usual oven structure and are preferably of heat insulating nature. The insulating portions are illustrated as being relatively thick in these views, and the walls may be covered by sheet metal panels as shown.

The interior of the oven is divided into sections, and, as illustrated, the center section is a combustion chamber. This central section is illustrated at 5. Any sort of fuel may be used for heating purposes, but as shown herein gas burners 6 are employed to which the gas may be supplied from a manifold 7. The compartment 5 is preferably insulated at the top as at 8 and by side walls 9 and 10. The oven may have a bottom wall 11 to rest upon the floor or other support.

Figure 1:
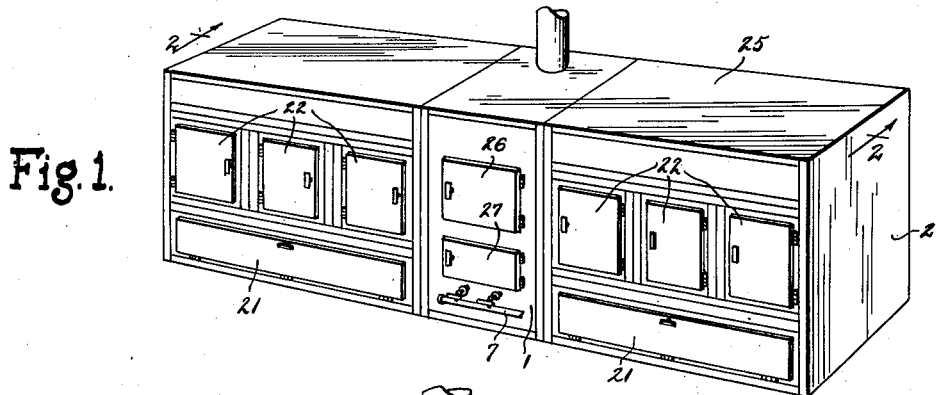
Fig. 1 is a perspective view of an oven structure made in accordance with the invention.
Figure 2:
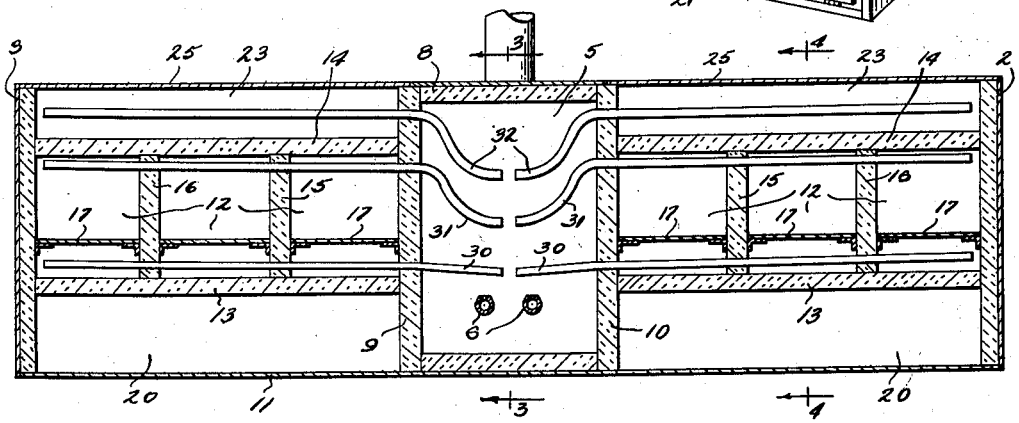
Fig. 2 is an enlarged sectional view taken substantially on line 2—2 of Fig. 1.
Figure 3:
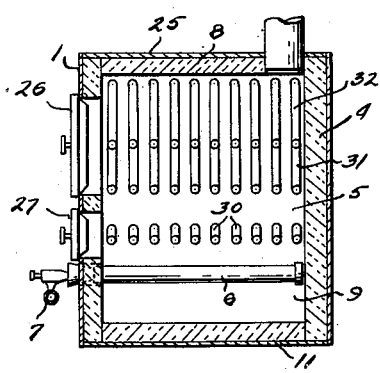
Fig. 3 is a sectional view taken substantially on line 3—3 of Fig. 2.
Figure 4:
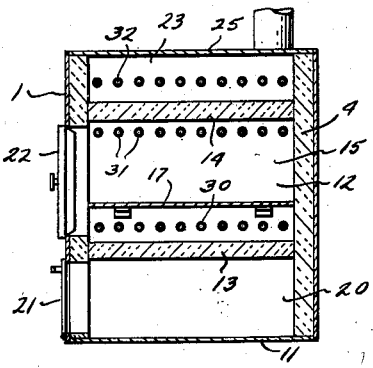
Fig. 4 is a sectional view taken substantially on line 4—4 of Fig. 2.

The interior of the oven is divided into other sections, and, as shown in Fig. 2, oven compartments 12 are defined by insulated walls 13 and 14 and other walls which may be insulated as at 15 and 16. The oven compartments may have shelves or supports 17. In Fig. 2 the oven structure is duplicated on opposite sides of the combustion compartment 5, and the same reference characters are applied to both sides.

This arrangement provides lower compartments 20 which may be closed by doors 21, and the oven compartments are accessible through doors 22. This also provides upper chambers 23 which are closed by the front wall of the oven, and a suitable metallic plate 25 which, however, may be in one or more sections, covers the chambers 23. The central combustion chamber may have one or more doors so that access may be had thereto, these doors being shown at 26 and 27.

The heat from the burners is transmitted through steam tubes. These tubes are known to those versed in the oven art, and each comprises, briefly, a length of tubing sealed at each end and containing a quantity of liquid such as water with the tubes arranged angularly so that the water, when condensed, flows to the lower end which is in proximity to the burners. The oven compartments are preferably equipped with two sets of steam tubes, namely, a lower set 30 and an upper set 31, the lower set being in the lower portion of the oven compartments and the upper set being in the upper portion of the oven compartments, with the tubes extending through the interior partitions as illustrated. The steam generated in these tubes by heat from the burners transmits the heat laterally to the oven compartments.

The hot plate arrangement is heated also by steam tubes, as shown at 32, these steam tubes terminating in the combustion chamber at their lower ends and extending into and substantially through the chambers 23. Since the oven illustrated in Figs. 1 to 4 is the same on each side of the combustion compartment, the same reference characters are applied to the tubes 30, 31 and 32.

With an oven of this nature, bake goods may be prepared in any one of the oven compartments, and temperature controls may be used for obtaining different temperature conditions in some of the compartments. For instance, the oven compartments on one side may be regulated to have a higher temperature than the oven compartments on the other side. Moreover, different numbers of steam tubes may be used on the two sides of the structure. All sorts of fried edible goods may be prepared on the hot plate 25. The compartments 20 may be used as storage compartments for various utensils or for all ready prepared foods.

In Figs. 5 to 9 an arrangement is shown wherein ovens are used only on one side of the structure. The same reference characters are applied to this stucture as are applied to the structure already described. The one side, however, comprises only a hot plate, as illustrated at 25a. In this form there is shown an arrangement for the heating of open vessels. In addition to the hot plate surface illustrated at 25b, the plate is provided with apertures 35 which may be recessed and shouldered, as illustrated, each for the reception of a cover plate 36 to complete the hot plate surface 25b. The cover plates may be removed and vessels placed over the apertures. To provide for individual heating of the vessels, a gas burner 37 may be located underneath each opening to direct a gas flame directly on the bottom of the vessel. These gas burners may be supplied with gas through a manifold 38.

In Figs. 10 to 13, an arrangement is shown wherein no ovens are provided, but only a hot plate arrangement and an arrangement for heating individual vessels. In this arrangement the center combustion chamber is substantially the same as the combustion chamber heretofore described, and the lateral chambers 23 containing the steam tubes 32 are defined by an insulated wall 40 and supported by legs 41. This provides a hot plate surface 25c. The center portion is provided with apertures 35a which may be closed by cover plates 36a or which may be arranged to receive a vessel, and preferably a gas burner 37a is located under each opening.

The type of device employed by the hotel, restaurant, or other eating house, may depend upon the desires of the person in charge or upon the particular type of food which may be made a specialty; but in any event, a structure is provided which provides considerable capacity for bake goods, boiled goods or fried goods. It is within the invention to place apertures in the hot plate in the form shown in Figs. 1 to 4 to adapt this form to the preparation of food stuff prepared in an open vessel, and to this end the apertures may be provided as illustrated in Fig. 6, or in the center portion as shown in Fig. 11. In some cases where bake goods are not prepared, as for example, where bake goods are obtained from the outside, the form illustrated in Figs. 10 to 13 may be used.

I claim:

1. A device for the preparation of baked and fried food stuffs which comprises, a cabinet-like structure, walls for defining a combustion chamber for fuel in the central portion of the cabinet, an oven compartment on each side of the combustion chamber, a hot plate upon which food stuffs may be fried and constituting the top of the cabinet, a heating chamber on each side of the combustion chamber and each positioned above an oven compartment and below a portion of the hot plate, two sets of steam tubes lying partially in the combustion chamber and extending laterally in opposite directions and into the oven compartments, and two sets of steam tubes lying partially in the combustion chamber and extending laterally in opposite directions into the said heating chambers.

2. A device for the preparation of baked and fried food stuffs which comprises, a cabinet-like structure, walls for defining a combustion chamber for fuel in the central portion of the cabinet, a plurality of oven compartments on each side of the combustion chamber, said oven compartments on each side of the combustion chamber being disposed side by side, a heating chamber extending laterally from each side of the combustion chamber with each heating chamber overlying the oven compartments on one side of the combustion chamber, means covering the heating chambers and comprising hot plates, and a plurality of steam tubes having their inner ends disposed in the combustion chamber and extending laterally therefrom, some of the steam tubes extending through a plurality of oven compartments and some of the steam tubes extending substantially through the heating chambers.

3. A device for the preparation of baked and fried food stuffs which comprises, a cabinet-like structure, walls for defining a combustion chamber for fuel in the central portion of the cabinet, a plurality of oven compartments on each side of the combustion chamber, said oven compartments on each side of the combustion chamber being disposed side by side, a heating chamber extending laterally from each side of the combustion chamber with each heating chamber overlying the oven compartments on one side of the combustion chamber, hot plate means for covering the heating chambers, a plurality of steam tubes having their inner ends disposed in the combustion chamber and extending laterally therefrom, some of the steam tubes extending through a plurality of oven compartments and some of the steam tubes extending substantially through the heating chambers, said steam tubes being disposed in different elevations substantially corresponding to the disposition of the oven compartments and heating chambers, and the inner ends of the heating tubes being disposed in superposed relation in the combustion chamber.

4. A device substantially as described comprising, walls defining a combustion chamber, means in the form of a hot plate upon which food stuffs may be fried and forming a substantially horizontal surface disposed laterally to each side of the combustion chamber and substantially in the plane of the top of the combustion chamber, means comprising lower and outer insulating walls defining a heating chamber underneath each laterally extending hot plate, and a plurality of sealed steam tubes having their inner ends disposed in the combustion chamber and extending laterally in opposite directions into and substantially through the heating chambers.

5. A device for the preparation of baked and fried food stuffs which comprises a cabinet-like structure, walls defining a combustion chamber for fuel substantially in the central portion of the structure, a plurality of oven compartments extending laterally from one side of the combustion chamber, hot plate means extending laterally to each side of the combustion chamber and providing a substantially flat surface upon which food stuffs may be fried, a heating chamber underlying each hot plate, one of said heating chambers being disposed between its adjacent hot plate and the oven compartments and overlying the oven compartments, and a plurality of steam tubes with their inner ends disposed in the combustion chamber, and some extending laterally through the oven compartments, some extending laterally through the heating compartment above said oven compartment and some extending laterally through the other heating chamber.

6. A device substantially for the purposes described comprising, means forming a combustion chamber having a top surface, means providing hot plates extending laterally to the opposite sides of the combustion chamber and substantially in the plane of the top surface of the combustion chamber, means for supporting the ends of the hot plates which are remote from the combustion chamber, a heating chamber disposed underneath each hot plate and having lower and outer insulating walls and substantially co-extensive with the hot plates and sealed steam tubes with their inner ends terminating in the combustion chamber and some extending laterally substantially through one heating chamber and some extending laterally substantially through the other heating chamber for transmitting heat from the combustion chamber to the hot plate.

7. A device substantially for the purposes described comprising, means forming a combustion chamber, top structure providing hot plates extending laterally to the opposite sides of the combustion chamber and substantially in the plane of the top of the combustion chamber, means for supporting the ends of the hot plates which are remote from the combustion chamber, a heating chamber disposed underneath each hot plate and steam tubes with their inner ends terminating in the combustion chamber and some extending laterally into one heating chamber and some extending laterally into the other heating chamber for transmitting heat from the combustion chamber to the hot plate, the top of the structure having one or more apertures therein and a burner for fuel located underneath each aperture.

ROBERT P. BOLLING.